(12) United States Patent
Xie

(10) Patent No.: US 9,513,505 B2
(45) Date of Patent: Dec. 6, 2016

(54) TRANSFLECTIVE LIQUID CRYSTAL DISPLAY PANEL AND LIQUID CRYSTAL DISPLAY DEVICE

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 270 days.

(21) Appl. No.: 14/348,746

(22) PCT Filed: Jun. 27, 2013

(86) PCT No.: PCT/CN2013/078209
§ 371 (c)(1),
(2) Date: Mar. 31, 2014

(87) PCT Pub. No.: WO2014/153885
PCT Pub. Date: Oct. 2, 2014

(65) Prior Publication Data
US 2016/0054621 A1     Feb. 25, 2016

(30) Foreign Application Priority Data

Mar. 26, 2013 (CN) .......................... 2013 1 0099613

(51) Int. Cl.
*G02F 1/1335* (2006.01)
*G02F 1/1337* (2006.01)
(Continued)

(52) U.S. Cl.
CPC ....... *G02F 1/133555* (2013.01); *G02F 1/1337* (2013.01); *G02F 1/1368* (2013.01);
(Continued)

(58) Field of Classification Search
CPC .................... G02F 1/133555; G02F 1/133345; G02F 1/133371; G02F 1/133514; G02F 1/136227; G02F 1/133553; G02F 1/1393; G02F 1/133707; G02F 2001/133742; G02F 1/134363; G02F 1/136213
(Continued)

(56) References Cited

U.S. PATENT DOCUMENTS

2003/0071945 A1*  4/2003  Kim ................. G02F 1/133555
                                                                349/113
2006/0238675 A1* 10/2006  Zhu ................. G02F 1/133555
                                                                349/114
(Continued)

FOREIGN PATENT DOCUMENTS

| CN | 1641438 A   | 7/2005  |
|----|-------------|---------|
| CN | 101576681 A | 11/2009 |
| CN | 103176307 A | 3/2013  |

OTHER PUBLICATIONS

International Permilinary Report on Parentability Appln. No. PCT/CN2013/078209; Dated Sep. 29, 2015.
(Continued)

*Primary Examiner* — Mike Qi
(74) *Attorney, Agent, or Firm* — Ladas & Parry LLP

(57) ABSTRACT

A transflective liquid crystal display panel and a liquid crystal display device are provided. The transflective liquid crystal display panel comprises a first substrate (100), a second substrate (200) opposed to the first substrate (100), and a liquid crystal layer disposed between the first substrate (100) and the second substrate (200); the first substrate (100) and the second substrate (200) comprise a plurality of sub-pixels, and each of the sub-pixels comprises a reflective region and a transmissive region; a common electrode (202) is provided on the second substrate (200) corresponding to
(Continued)

an entirety of the transmissive region and the reflective region, a reflective layer is provided at a side of the common electrode close to the first substrate (100) and at a portion corresponding to the reflective region; and the reflective layer comprises a first reflective layer (2041) which is configured as a reflective layer and pixel electrode and a second reflective layer (2042) is configured only to reflect light.

18 Claims, 2 Drawing Sheets

(51) Int. Cl.
*G02F 1/1343* (2006.01)
*G02F 1/1333* (2006.01)
*G02F 1/1362* (2006.01)
*G02F 1/1368* (2006.01)

(52) U.S. Cl.
CPC .... *G02F 1/13624* (2013.01); *G02F 1/133345* (2013.01); *G02F 1/133514* (2013.01); *G02F 1/133528* (2013.01); *G02F 1/134363* (2013.01); *G02F 2001/134345* (2013.01)

(58) Field of Classification Search
USPC .......................................... 349/114, 130, 141
See application file for complete search history.

(56) References Cited

U.S. PATENT DOCUMENTS

| 2008/0106663 A1* | 5/2008 | Kim .................. G02F 1/134336 349/43 |
| 2009/0015768 A1* | 1/2009 | Igeta ................. G02F 1/133512 349/106 |
| 2011/0090442 A1* | 4/2011 | Koma ............... G02F 1/133371 349/123 |
| 2013/0286307 A1* | 10/2013 | Nishida ............. G02F 1/133555 349/33 |

OTHER PUBLICATIONS

The State Intellectual Property Office of the People's Republic of China ("SIPO") (Chinese Language) First Office Action issued on Dec. 31, 2014 by SIPO in Chinese Patent Application No. 201310099613.0, 5 pages.
English Translation of The State Intellectual Property Office of the People's Republic of China ("SIPO") First Office Action issued on Dec. 31, 2014 by SIPO in Chinese Patent Application No. 201310099613.0, 2 pages.
International Search Report for International Application No. PCT/CN2013/078209.

* cited by examiner

TRANSFLECTIVE LIQUID CRYSTAL DISPLAY PANEL AND LIQUID CRYSTAL DISPLAY DEVICE

CROSS REFERENCE TO RELATED APPLICATIONS

This application is based on International Application No. PCT/CN2013/078209 filed on Jun. 27, 2013, which claims priority to Chinese National Application No. 201310099613.0 filed on Mar. 26, 2013. The entire contents of each and every foregoing application are incorporated herein by reference.

TECHNICAL FIELD

Embodiments of the present invention relate to a transflective liquid crystal display panel and a liquid crystal display device.

BACKGROUND

A liquid crystal display panel is generally constituted by cell assembling a color filter substrate and an array substrate with a liquid crystal layer sealed therebetween. As a liquid crystal molecule itself does not emit light, a display requires a light source for image displaying. A liquid crystal display can be categorized as a transmissive type, a reflective type, or a transflective type, based on the adopted types of the light source.

The transmissive type liquid crystal display mainly employs a backlight as the light source disposed behind the liquid crystal panel. The pixel electrode on the array substrate is a transparent electrode, used as a transmissive region, which facilitates light from the backlight to transmit through the liquid crystal layer to display images. The reflective type liquid crystal display mainly employs a front light or an exterior light as the light source, metal or other materials with excellent reflective properties is disposed on the array substrate as a reflective region, suitable for reflecting the light from the front light or the exterior light. The transflective type liquid crystal display can be deemed as a combination of the transmissive type and the reflective type, where both the reflective region and the transmissive region are disposed on the array substrate, and both the backlight and the front light or the exterior light are used for image displaying.

The transmissive type liquid crystal display (LCD) has an advantage of being able to display a bright image in a dark environment; nevertheless, it has the disadvantage that only a low percentage of light from the backlight is transmitted, meaning a low utilization rate of the backlight. Improving the display brightness demands significantly raising the luminance of the backlight, necessitating high energy consumption.

The reflective type LCD has the advantage of being able to use sun light or front light source as the light source, and thus has relatively low energy consumption; it, however, cannot display an image in a dark environment, due to the dependency on exterior light.

The transflective type liquid crystal display combines the advantages of the transmissive type and the reflective type liquid crystal panels, which can display a bright image in a dark environment, and can be used indoor or outdoor; therefore, it is widely used to display devices of electronic products, such as, mobile products such as mobile phone, digital camera, handheld computer, GPRS.

SUMMARY

One of technical problems solved by the present invention is providing a transflective liquid crystal display panel and a liquid crystal display device, to realize a transflective liquid crystal display structure with a single cell thickness, which use a new electrode structure to realize a transflective display effect and simplify the manufacturing process.

An embodiment of the present invention provides a transflective liquid crystal display panel, comprising: a first substrate, a second substrate opposed to the first substrate, and a liquid crystal layer disposed between the first substrate and the second substrate; wherein, the first substrate and the second substrate comprise a plurality of sub-pixels, and each of the sub-pixels comprises a reflective region and a transmissive region, wherein, a common electrode is provided on the second substrate corresponding to the entirety of the transmissive region and the reflective region;

at a side of the common electrode close to the first substrate, a reflective layer is provided at the portion corresponding to the reflective region in each sub-pixel;

the reflective layer comprises a first reflective layer which is configured as a reflective layer and pixel electrode, and a second reflective layer which is configured only to reflect light; the first reflective layer is provided in one of two adjacent reflective regions, and the second reflective layer is provided in the other of the two adjacent reflective regions.

In one example, each of the sub-pixels on the second substrate comprises a plurality of first reflective layers and a plurality of second reflective layers arranged alternately.

In one example, in each of the sub-pixels, the reflective region and the transmissive region are arranged alternately.

In one example, on the second substrate, each of the sub-pixels comprises a thin film transistor used as a switch, and the first reflective layer is electrically connected to the drain electrode of the thin film transistor.

In one example, the first reflective layer is made of an opaque metal material.

In one example, the liquid crystal layer is a positive liquid crystal layer.

In one example, the transmissive region has a liquid crystal cell thickness equal to that of the reflective region.

In one example, the second substrate comprises:

a second base substrate;

the common electrode formed at the side of the second base substrate close to the first substrate and corresponding to the entirety of the reflective region and the transmissive region;

an insulating layer formed at the side of the common electrode close to the first substrate, and corresponding to the entirety of the reflective region and the transmissive region;

the first reflective layer and the second reflective layer formed at the side of the insulating layer close to the first substrate, and separately disposed corresponding to the reflective region; and a second alignment layer formed at the side of the insulating layer close to the first substrate, located on the first reflective layer and the second reflective layer, and corresponding to the reflective region and the transmissive region.

In one example, the first substrate comprises:

a first base substrate; and a first alignment layer formed at the side of the first base substrate close to the second substrate, and corresponding to the entity of the reflective region and the transmissive region.

In one example, the liquid crystal cell thickness is 3~6 µm; the reflective region of the sub-pixels has a width of 2-10 µm; and the transmissive region of the sub-pixels has a width of 1-8 µm.

In one example, the liquid crystal cell thickness is 4.4 µm; the reflective region of the sub-pixels has a width of 6 µm; and the transmissive region of the sub-pixels has a width of 4 µm.

In one example, the first substrate is a color filter substrate; and the second substrate is an array substrate.

Another embodiment of the present invention provides a liquid crystal display device, comprising the transflective liquid crystal display panel according to any embodiment of the present invention.

In one example, the liquid crystal display device further comprises:

a first polarizer formed at the side of the first substrate distal from the second substrate, and disposed corresponding to the entity of the reflective region and the transmissive region; and a second polarizer formed at the side of the second substrate distal from the first substrate, and disposed corresponding to the entity of the reflective region and the transmissive region.

In the above solution, while the transflective display effect is achieved by designing the electrode structures of the transmissive region and the reflective region, the manufacturing process is simplified as a portion of the reflective layers of the reflective region can also be used as the pixel electrode; in addition, the structure of a single cell thickness can be realized and the difficulty of the process is reduced.

In addition, in a further technical solution of the present invention, as the first reflective layer used both as the pixel electrode and the reflective layer is made of an opaque metal material, it can reduce the resistance of the pixel electrodes and reduce the delay of pixel voltage signals.

BRIEF DESCRIPTION OF THE DRAWINGS

In order to more clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
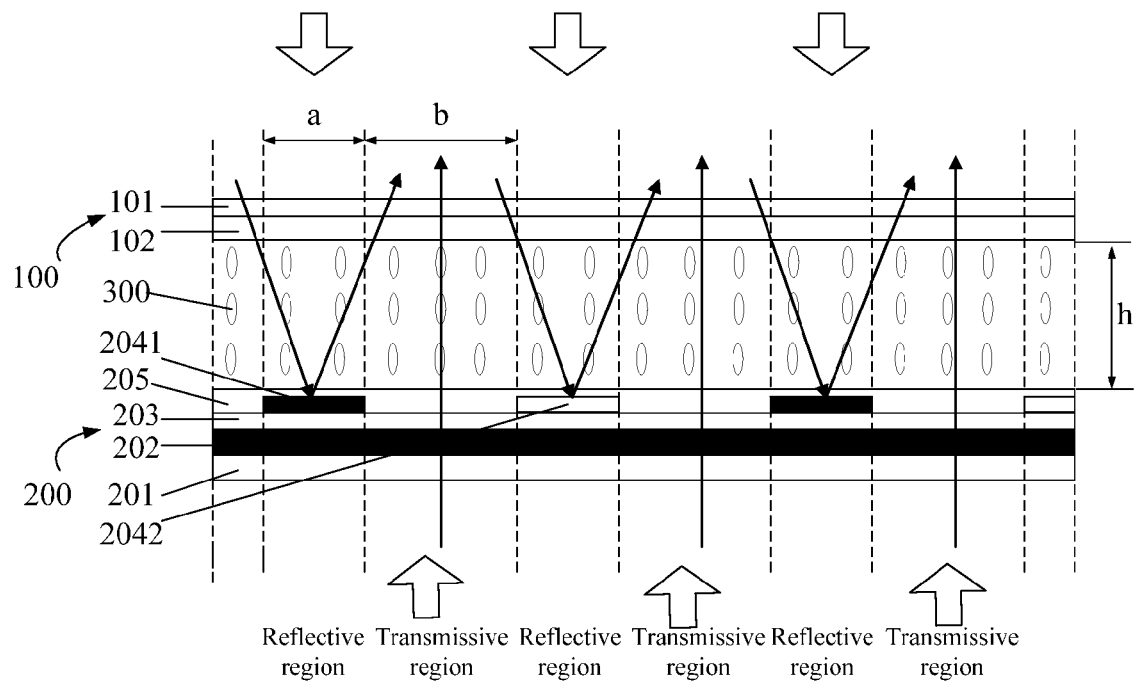
FIG. 1 is a structural schematic diagram of a transflective liquid crystal display panel upon no voltage being applied according to the present invention.
Figure 2:
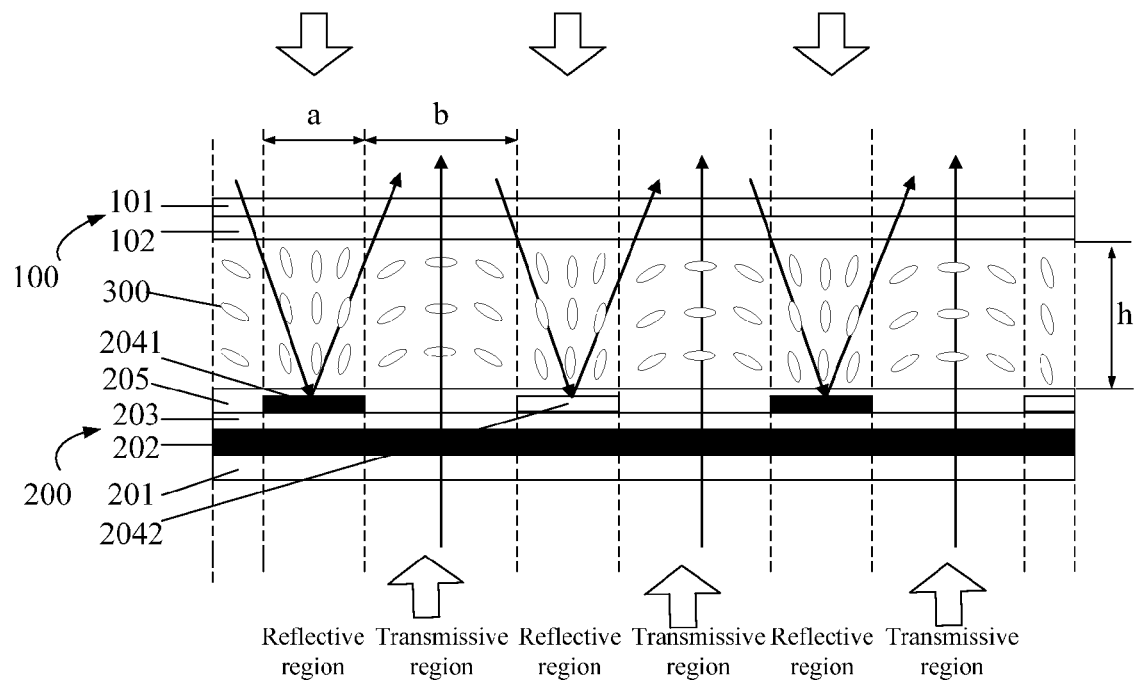
FIG. 2 is a structural schematic diagram of the transflective liquid crystal display panel upon a voltage being applied according to the present invention.

As illustrated in FIGS. 1 and 2, embodiments of the present invention provide a transflective liquid crystal display panel, comprising: a first substrate 100, a second substrate 200 opposed to the first substrate 100, and a liquid crystal layer disposed between the first substrate 100 and the second substrate 200.

The first substrate 100 and the second substrate 200 comprise several sub-pixels, and each of the sub-pixels comprises a reflective region and a transmissive region. As illustrated in FIG. 1 or 2, the reflective region and the transmissive region are arranged alternately.

A common electrode is provided on the second substrate 200 corresponding to the entirety of the transmissive region and the reflective region.

A reflective layer is disposed at the side of the common electrode 202 close to the first substrate 100, and corresponding to the portion of the reflective region, and the reflective layer comprises a first reflective layer 2041 and a second reflective layer 2042. The first reflective layer 2041 is provided in one of the two adjacent reflective regions, and the second reflective layer 2042 is provided in the other of the two adjacent reflective regions. The first reflective layer 2041 can be used both as a reflective layer and a pixel electrode, while the second reflective layer 2042 only has a function of reflecting light, but is not used as the pixel electrode.

For example, data lines and gate lines crossing with each other are formed on the second substrate 200, and the data lines and the gate lines surround to form sub-pixels arranged in matrix. Each of the sub-pixels is disposed with a TFT switch, wherein, the TFT switch comprises a gate electrode, a source electrode, a drain electrode and an active layer; the gate electrode is connected with the gate lines, the source electrode is connected with the data lines, the drain electrode is connected with the first reflective layer 2041, and the active layer is formed between the source and drain electrodes and the gate electrode. Thus, the first reflective layer 2041 can be used as both the reflective layer and the pixel electrode.

For example, the liquid crystal layer is a positive liquid crystal layer. For example, a first alignment layer 102 is provided on the first substrate 100, and a second alignment layer 205 is provided on the second substrate 200. As illustrated in FIG. 1, upon no electricity being applied, in the transmissive region and the reflective region, both the first alignment layer 102 on the first substrate 100 (for example, a color filter substrate) and the second alignment layer 205 on the second substrate 200 (for example, an array substrate) adopt a vertical alignment manner in the embodiment of the present invention, such that positive liquid crystal molecules 300 are orientated vertically upon no electricity being applied, which can reduce light leak in a dark state and improve contrast.

In addition, for example, the transmissive region and the reflective region have an equal liquid crystal cell thickness.

In addition, in the transflective liquid crystal display panel provided by the present embodiment, the first reflective layer 2041 also used as the pixel electrode is made of opaque metal materials. Thus, as the pixel electrodes are made of metal materials, the resistance of the pixel electrodes can be reduced and the delay of pixel voltage signals can be decreased.

Figure 4:
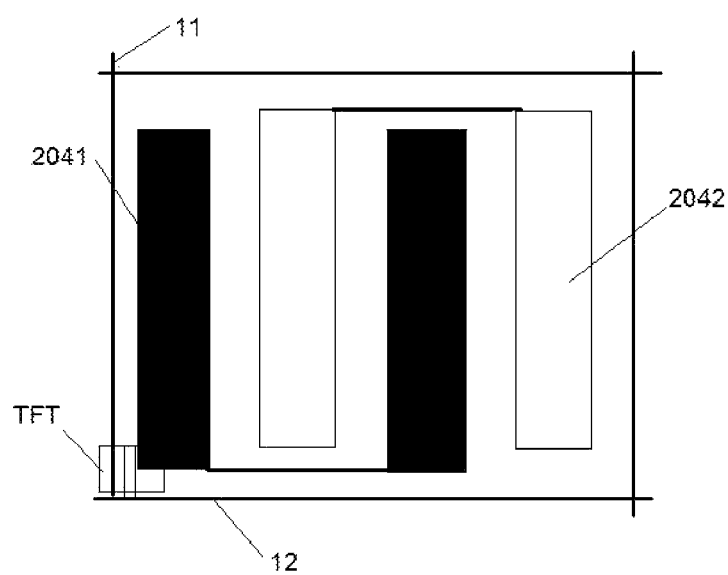
FIG. 4 is a schematic diagram of arrangement of reflective layers in the transflective liquid crystal display panel according to the present invention.

For example, FIG. 4 is a schematic diagram of arrangement of the reflective layers 2041 and 2042 in one of the sub-pixels. As illustrated in FIG. 4, the reflective layers 2041 and the reflective layers 2042 are distributed alternately. In addition, each of the sub-pixels can comprise a thin film transistor as a switch. The gate electrode of the thin film transistor is electrically connected with a corresponding gate line 12, and the source electrode of the thin film transistor is electrically connected with a corresponding data line 11. The drain electrode of the thin film transistor is electrically connected with the reflective layer 2041. In order to conveniently apply signals to the reflective layer 2041, a plurality of the reflective layers 2041 in each of the sub-pixels can be electrically connected to each other. In addition, a plurality of the reflective layers 2042 in each of the sub-pixels can also be electrically connected to each other. It should be noted that FIG. 4 only schematically indicates the connection method of the reflective layers, and the embodiments of the present invention are not limited to this. As long as the reflective layer 2041 can be connected to the thin film transistor TFT to obtain data signals from the data lines, the embodiments of the present invention can adopt any appropriate connection method. In addition, FIG. 4 only indicates two reflective layers 2041 and two reflective layers 2042, but the numbers are only exemplary, and can be adjusted according to needs.

As for the above solution, as the transflective liquid crystal display panel provided by the present embodiment adopts an electrode structure similar to an electrode structure of an ADS mode (Advanced Super Dimension Switch, a multidimensional electrical field is formed by the electrical field generated at the edge of the slit electrodes within one plane and the electrical field generated between the slit electrode layer and plate-like electrodes, such that the liquid crystal molecules of all orientations between the slit electrodes and directly above the electrodes can rotations within the liquid crystal cell, thus the liquid crystal operational efficiency is improved and the transmittance is enhanced), and in a sub-pixel region, for two adjacent reflective layers, one is used as the pixel electrode while the other is not used as the pixel electrode. (That is, the reflective layer used as the pixel electrode and the reflective layer not used as the pixel electrode are arranged alternately), upon electricity being applied, the positive liquid crystal molecules 300 can be deflected toward a horizontal direction under the effect of a horizontal electrical field, generate phase delay along the horizontal direction, where the arrangement manner of the liquid crystal molecules is illustrated in FIG. 2, and the liquid crystal molecules can generate a relatively large horizontal phase delay under the effect of the horizontal electrical field of the transmissive region, while generate a relatively small horizontal phase delay under the effect of the horizontal electrical field in the reflective region, and finally the phase delays of the transmissive region and the reflective region are matched, to achieve the transflective display effect; and, as a part of the reflective layers of the reflective region can be used as the pixel electrode at the same time, the manufacturing process is simplified; in addition, structure of the single cell thickness can simplify the difficulty of the process.

For example, FIG. 1 is a structural schematic diagram of the transflective liquid crystal display panel upon no electricity being applied according to the present embodiment; and FIG. 2 is a structural schematic diagram of the transflective liquid crystal display panel upon electricity being applied according to the present embodiment. Both FIGS. 1 and 2 indicate the structure of only one sub-pixel. The liquid crystal display panel, however, can have a plurality of sub-pixel structures arranged in a two-dimensional matrix.

As illustrated in FIG. 1, as the first alignment layer 102 is provided on the first substrate 100 and the second alignment layer 205 is provided on the second substrate 200, upon no electricity being applied, in the transmissive region and the reflective region, both the first alignment layer 102 on the first substrate 100 (for example, the color filter substrate) and the second alignment layer 205 on the second substrate 200 (for example, the array substrate) adopt the vertical alignment manner in the embodiment of the present invention, such that positive liquid crystal molecules 300 are orientated vertically upon no electricity being applied, which reduces light leak in a dark state and improves the contrast.

As illustrated in FIG. 2, upon electricity being applied, in the transmissive region, the positive liquid crystal molecules 300 are gradually changed into an approximately horizontal alignment manner as illustrated in FIG. 2 due to the effect of the horizontal electrical field, and generate a horizontal phase delay.

Upon electricity being applied, in the reflective region, the positive liquid crystal molecules 300 are generally changed into an alignment manner as illustrated in FIG. 2 due to the effect of the electrical field, and generate a relatively small horizontal phase delay.

If a transflective display effect of a single cell thickness structure is desired, the width of the transmissive region, the width of the reflective region and the liquid crystal cell thickness can be optimized such that the light passing through the transmissive region can generate more phase delay than the reflective region.

Suppose the relatively large horizontal phase delay generated by the light passing through the positive liquid crystal in the transmissive region under the effect of the horizontal electrical field is $\Delta n1$; and the relatively small horizontal phase delay generated by the positive liquid crystal in the reflective region under the effect of an inclined electrical field is $\Delta n2$. To achieve the transflective display, the phase delay of the light passing through the liquid crystal of the transmissive region is: $\Delta n1 \times dn = \lambda/2$; wherein, do is the optical path of the light passing through the liquid crystal of the transmissive region; the phase delay of the light passing through the liquid crystal of the reflective region at one time is: $\Delta n2 \times dm = \lambda/4$; wherein, dm is the optical path of the light passing through the liquid crystal of the reflective region at one time;

As for the transmissive region and the reflective region, if $\Delta n$ of the liquid crystal of the entire transmissive region under the effect of the electrical field is twice of the reflective region, i.e., $\Delta n1/\Delta n2 = 2$, the optical path of the light passing through the liquid crystal in the transmissive region is equivalent to the optical path of the light passing through the liquid crystal in the reflective region at one time, i.e., $dn = dm$; from the overall effect, $\Delta n1 \times dn = 2\Delta n2 \times dm$; while in the reflective region, the light needs to pass through the liquid crystal of the reflective region twice, thus, the phase delay of the light passing through the liquid crystal in the transmissive region match the phase delay of the light passing through the liquid crystal in the reflective region, and finally the transflective display effect is achieved.

A preferable solution is provided as follows in which the width b of the transmissive region, the width a of the reflective region and the liquid crystal cell thickness h are optimized to achieve the transflective display effect. It should be explained that, as the entirety of the reflective layers is disposed corresponding to the reflective region, the width a of the reflective region is the total width of the first reflective layer 2041 and the second reflective layer 2042.

For example, as illustrated in FIGS. 1 and 2, for the transflective liquid crystal display panel provided by the present embodiment, the liquid crystal cell thickness h is 3~6 μm; the width a of the reflective region of the sub-pixels is 2~10 μm; and the width b of the transmissive region of the sub-pixels is 1~8 μm.

In one example, the liquid crystal cell thickness h is 4.4 μm; the width a of the reflective region of the sub-pixels is 6 μm; and the width b of the transmissive region of the sub-pixels is 4 μm.

It should be understood that, in the actual application, the width b of the transmissive region, the width a of the reflective region and the liquid crystal cell thickness h and etc. are not limited to the preferable solution provided by the present embodiment.

In addition, the present embodiment further provides a preferable assembling method for the first substrate 100 and the second substrate 200.

As illustrated in FIGS. 1 and 2, the first substrate 100 comprises:
  a first base substrate 101; and
  a first alignment layer 102 formed at a side of the first base substrate 101 close to the second substrate 200, and disposed corresponding to an entirety of the reflective region and the transmissive region.

The second substrate 200 comprises:
  a second base substrate 201;
  a common electrode 202 formed at a side of the second base substrate 201 close to the first substrate 100, and disposed corresponding to the entirety of the reflective region and the transmissive region;
  an insulating layer 203 formed at a side of the common electrode 202 close to the first substrate 100, and disposed corresponding to the entirety of the reflective region and the transmissive region;
  the first reflective layer 2041 and the second reflective layer 2042 formed at a side of the insulating layer 203 close to the first substrate 100, and disposed corresponding to two adjacent reflective regions spaced apart; and
  a second alignment layer 205 formed at a side of the insulating layer 203 close to the first substrate 100, located on the first reflective layer 2041 and the second reflective layer 2042, and disposed corresponding to the reflective region and the transmissive region.

The insulating layer 203 is located between the common electrode 202 and the first reflective layer 2041 (pixel electrode) and has the function of insulation.

The second alignment layer 205 is located at the side of the insulating layer 203 close to the first substrate 100, and located above the first reflective layer 2041 and the second reflective layer 2042, and on the one hand, it has the function to align the positive crystal molecules 300 vertically upon no electricity being applied, and on the other hand, it has the function of avoiding unequal cell thicknesses of the transmissive region and the reflective region due to the arrangement of the first reflective layer and the second reflective layer.

In addition, the first base substrate 101 and the second base substrate 201 can select materials such as glass, quartz, transparent resin, and this is not defined herein.

In addition, it should be described that, for the transflective liquid crystal display panel provided by the present embodiment, the voltages applied to the pixel electrodes in the reflective region of the sub-pixels are equivalent to each other, the power can either be supplied by the same TFT switch, or by different TFT switches.

For example, the first substrate 100 in the transflective liquid crystal display panel provided by the present embodiment is a color filter substrate, and the second substrate 200 is an array substrate.

Another embodiment of the present invention provides a liquid crystal display device comprising the above transflective liquid crystal display panel. The liquid crystal display device can be products or members having a display function such as mobile phone, flat computer, television, displays, notebook computer, digital photo frame and navigators.

Figure 3:
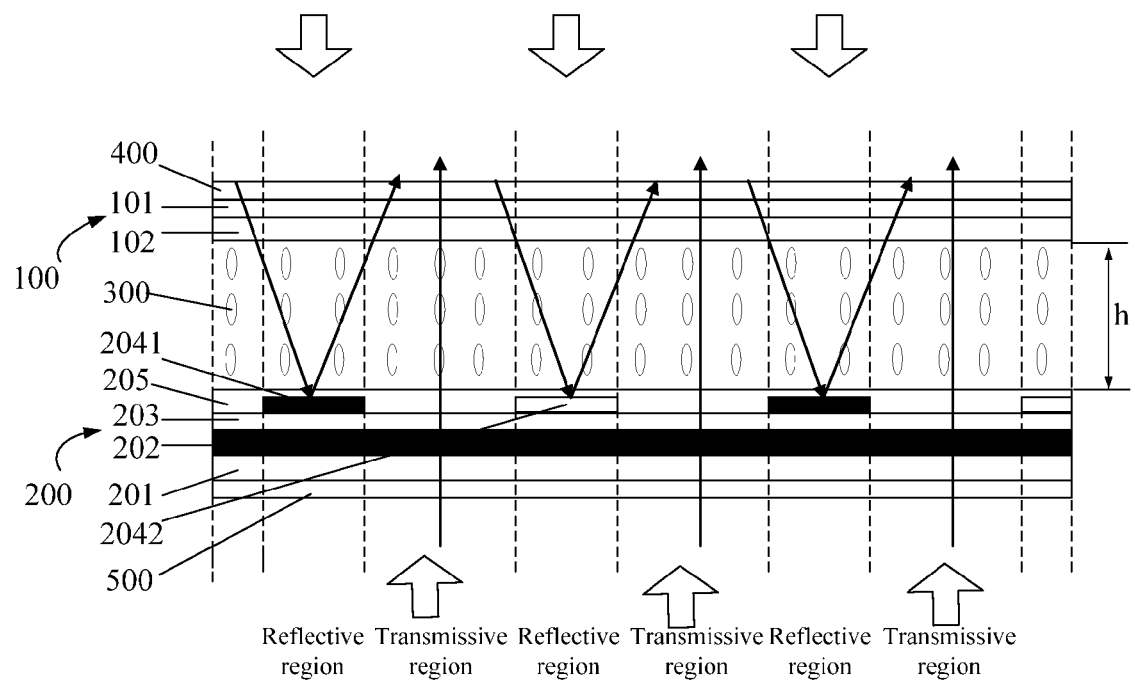
FIG. 3 is a structural schematic diagram of a transflective liquid crystal display device according to the present invention.

As illustrated in FIG. 3, the liquid crystal display device provided by the present embodiment further comprises: a first polarizer 400 formed at the side of the first substrate 100 distal from the second substrate 200, and disposed corresponding to the entirety of the reflective region and the transmissive region; and a second polarizer 500 formed at the side of the second substrate 200 distal from the first substrate 100, and disposed corresponding to the entirety of the reflective region and the transmissive region.

The embodiments described above are just exemplary one of the present invention, and are not intended to limit the scope of protection of the invention. The scope of protection of the present invention shall be defined by the appended claims.

The invention claimed is:

1. A transflective liquid crystal display panel, comprising: a first substrate, a second substrate opposed to the first substrate, and a liquid crystal layer disposed between the first substrate and the second substrate; wherein, the first substrate and the second substrate comprise a plurality of sub-pixels, and each of the sub-pixels comprises a reflective region and a transmissive region, wherein,
  a common electrode is provided on the second substrate corresponding to an entirety of the transmissive region and the reflective region,
  a reflective layer is provided at a side of the common electrode close to the first substrate and at a portion corresponding to the reflective region in each sub-pixel;
  the reflective layer comprises a first reflective layer which is configured as a reflective layer and pixel electrode and a second reflective layer which is configured only to reflect light; the first reflective layer is provided in one of two adjacent reflective regions, and the second reflective layer is provided in the other of the two adjacent reflective regions, and
  the transmissive region has a liquid crystal cell thickness equal to that of the reflective region.

2. The transflective liquid crystal display panel according to claim 1, wherein, each of the sub-pixels on the second substrate comprises a plurality of first reflective layers and a plurality of second reflective layers arranged alternately.

3. The transflective liquid crystal display panel according to claim 2, wherein, in each of the sub-pixels, the reflective region and the transmissive region are arranged alternately.

4. The transflective liquid crystal display panel according to claim 2, wherein, on the second substrate, each of the sub-pixels comprises a thin film transistor used as a switch, and the first reflective layer is electrically connected to a drain electrode of the thin film transistor.

5. The transflective liquid crystal display panel according to claim 2, wherein, the first reflective layer is made of an opaque metal material.

6. The transflective liquid crystal display panel according to claim 2, wherein, the liquid crystal layer is a positive liquid crystal layer.

7. The transflective liquid crystal display panel according to claim 2, wherein, the second substrate comprises:
   a second base substrate;
   the common electrode formed at a side of the second base substrate close to the first substrate and corresponding to the entirety of the reflective region and the transmissive region;
   an insulating layer formed at a side of the common electrode close to the first substrate, and corresponding to the entirety of the reflective region and the transmissive region;
   the first reflective layer and the second reflective layer formed at a side of the insulating layer dose to the first substrate, and separately disposed corresponding to the reflective region; and
   a second alignment layer formed at a side of the insulating layer close to the first substrate, located on the first reflective layer and the second reflective layer, and corresponding to the reflective region and the transmissive region.

8. The transflective liquid crystal display panel according to claim 1, wherein, in each of the sub-pixels, the reflective region and the transmissive region are arranged alternately.

9. The transflective liquid crystal display panel according to claim 1, wherein, on the second substrate, each of the sub-pixels comprises a thin film transistor used as a switch, and the first reflective layer is electrically connected to a drain electrode of the thin film transistor.

10. The transflective liquid crystal display panel according to claim 1, wherein, the first reflective layer is made of an opaque metal material.

11. The transflective liquid crystal display panel according to claim 1, wherein, the liquid crystal layer is a positive liquid crystal layer.

12. The transflective liquid crystal display panel according to claim 1, wherein, the second substrate comprises:
   a second base substrate;
   the common electrode formed at a side of the second base substrate close to the first substrate and corresponding to the entirety of the reflective region and the transmissive region;
   an insulating layer formed at a side of the common electrode close to the first substrate, and corresponding to the entirety of the reflective region and the transmissive region;
   the first reflective layer and the second reflective layer formed at a side of the insulating layer close to the first substrate, and separately disposed corresponding to the reflective region; and
   a second alignment layer formed at a side of the insulating layer close to the first substrate, located on the first reflective layer and the second reflective layer, and corresponding to the reflective region and the transmissive region.

13. The transflective liquid crystal display panel according to claim 1, wherein, the first substrate comprises:
   a first base substrate; and
   a first alignment layer formed at a side of the first base substrate close to the second substrate, and corresponding to the entirety of the reflective region and the transmissive region.

14. The transflective liquid crystal display panel according to claim 1, wherein,
   the display panel has a liquid crystal cell thickness of 3~6μm;
   the reflective region of the sub-pixels has a width of 2-10μm; and
   the transmissive region of the sub-pixels has a width of 1-8μm.

15. The transflective liquid crystal display panel according to claim 14, wherein,
   the liquid crystal cell thickness is 4.4μm;
   the reflective region of the sub-pixels has a width of 6 μm; and
   the transmissive region of the sub-pixels has a width of 4 μm.

16. The transflective liquid crystal display panel according to claim 1, wherein,
   the first substrate is a color filter substrate; and the second substrate is an array substrate.

17. A liquid crystal display device, comprising the transflective liquid crystal display panel according to claim 1.

18. The liquid crystal display device according to claim 17, further comprising:
   a first polarizer formed at a side of the first substrate distal from the second substrate, and disposed corresponding to the entirety of the reflective region and the transmissive region; and
   a second polarizer formed at a side of the second substrate distal from the first substrate, and disposed corresponding to the entirety of the reflective region and the transmissive region.

* * * * *